Patented Oct. 16, 1951

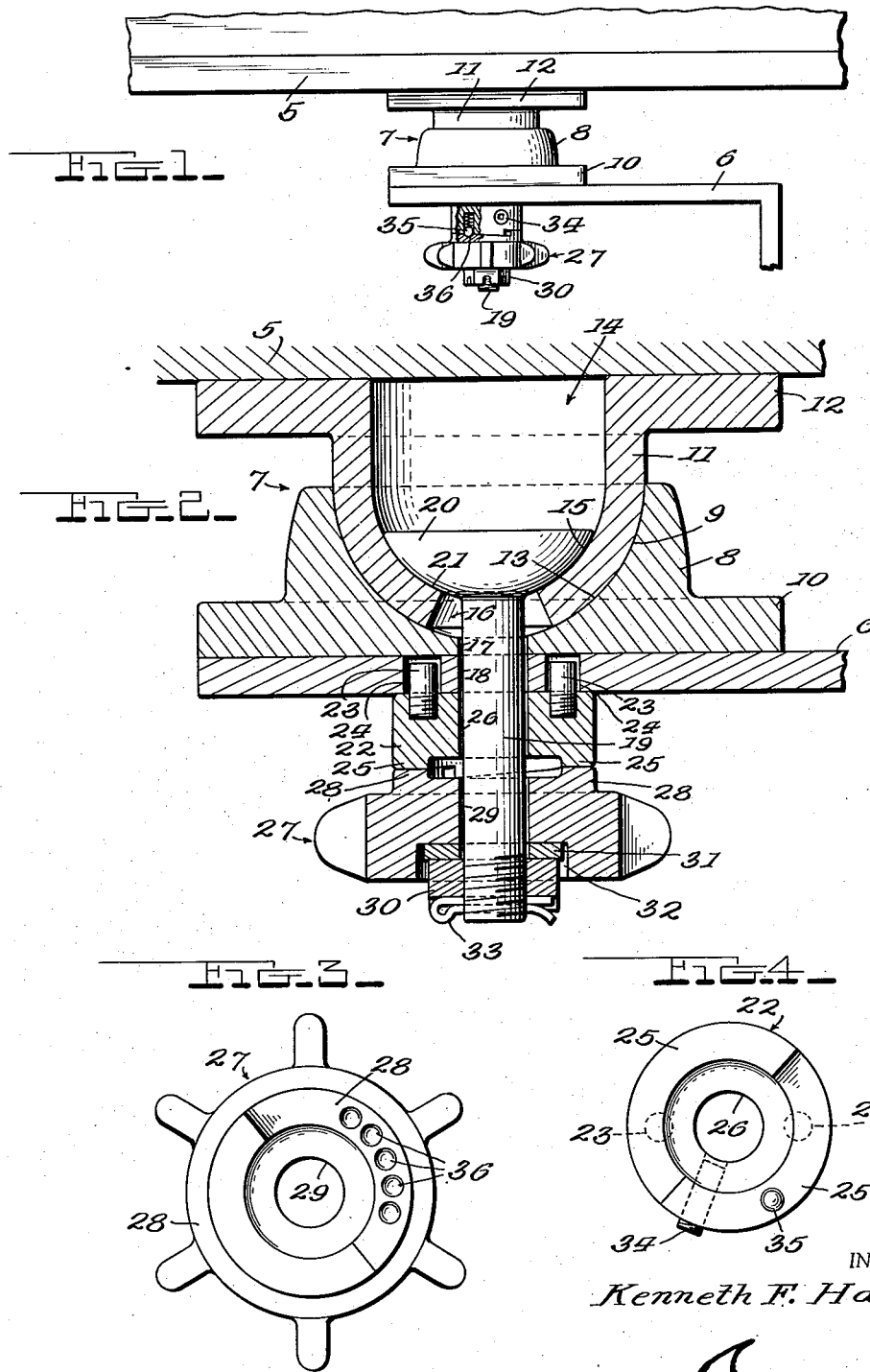

2,571,443

UNITED STATES PATENT OFFICE 2,571,443

ADJUSTABLE SEAT MOUNT

Kenneth F. Hair, Lapel, Ind.

Application August 4, 1950, Serial No. 177,687

3 Claims. (Cl. 155—120)

This invention relates to a novel means designed primarily for so mounting the seat of a farm tractor, mowing machine, or other mobile machine, that said seat may be adjusted to the most comfortable or advantageous position; and the invention is of particular advantage when the machine is being operated under such conditions that it is transversely tilted, for example, when mowing on the side of a hill or plowing with one tractor wheel in a furrow, as the seat may be readily leveled instead of requiring that the operator sit in an uncomfortable and tiresome position.

The object of the invention is to provide an exceptionally simple and inexpensive, yet an effective and durable seat mount which may be quickly and easily adjusted without the use of a wrench or other tool.

With the above and other objects in view that will become apparent as the nature of the invention is better understood, the same consists in the novel form, combination and arrangement of parts hereinafter more fully described, shown in the accompanying drawing, and claimed.

In the drawing:

Fig. 1 is a side elevation showing a fragment of a seat, a portion of an underlying support, and the invention mounting said seat on said support, Fig. 2 is an enlarged vertical sectional view of the mount and contiguous portions of the seat and support.

Fig. 3 is a top view of the hand wheel by means of which the mount is loosened for adjustment and re-tightened to maintain the adjustment, and Fig. 4 is a bottom view of the collar which is cooperable with the hand wheel.

A preferred construction has been shown and will be rather specifically described, but variations may of course be made within the scope of the invention as claimed, A fragment of a seat is shown at 5, a portion of an underlying support at 6, and the seat mount at 7, said mount including a structure commonly known as a ball and socket joint, to allow universal adjustment of the seat.

A socket member 8 is provided having an upwardly open socket 9 of substantially hemispherical form, said socket member 8 having a base 10 to rest solidly upon the support 6. This base 10 may be secured to the support in any suitable manner. The socket 9 receives the lower end of a stub 11 secured to the seat 5, said stub having a suitable attaching flange 12 at its upper end and being provided with a substantially hemi-spherical lower end 13 rockably received in said socket. An upwardly open recess 14 is formed in the stub 11 and the lower end 15 of this recess is substantially hemispherical and concentric with the lower end 13 of said stub. A relatively large central opening 16 is formed in the lower end of the stub 11 and communicates with the lower end of the recess 14; and a relatively small central opening 17 is formed from the lower end of the socket 9 through the lower side of the base 10. Also, the support 6 is provided with an opening 18 alined with the opening 17. A vertical bolt 19 extends through the openings 16, 17, and 18 and projects downwardly beyond the support 6, said bolt 19 being provided at its upper end with a head 20 located within the recess 14, said head having a convex lower side 21 resting upon the lower end 15 of said recess. The bolt 19 is of considerably less diameter than the opening 16 but need only have slight clearance in the openings 17 and 18.

A collar 22 surrounds the bolt 19 and contacts with the lower side of the support 6. This collar 22 is so connected with the support that said collar cannot rotate. This is accomplished by providing the collar with upstanding studs 23 received in openings 24 in the support 6. The lower side of the collar 22 is provided with two arcuate pitched cams 25 concentric with the central opening 26 of said collar, and this opening has a slight clearance with the bolt 19.

A hand wheel 27 underlies the collar 22 and is provided with two arcuate pitched cams 28 which contact with the cams 25 of said collar. This hand wheel is formed with a central opening 29 through which the lower portion of the bolt 19 extends, and the various parts are held assembled by means of a nut 30 threaded on the lower extremity of said bolt. A washer 31 is preferably interposed between the nut 30 and the hand wheel, and the latter may be recessed at 32 to receive said washer and the upper portion of said nut. This nut is locked by a cotter pin 33. A set screw 34 (Figs. 1 and 4) may be carried by the collar 22 to hold the bolt 19 against turning while threading the nut 30 onto said bolt, but said set screw should be loosened after the nut is in place, in order that the bolt may have slight vertical movement during adjustment of the mount, as will become more apparent hereinafter.

In finally assembling the parts, the hand wheel 27 is turned until the high ends of its cams 28 are between the ends of the cams 25 of collar 22, and the nut 30 is then tightened sufficiently to draw the various elements together and hold the seat 5 against tilting. The nut is then locked. Thereafter, any time seat adjustment is required, counter-clockwise turning of the hand wheel 27 will loosen the mount to permit said adjustment. Then, after adjustment, clockwise turning of the hand wheel will cause the cams 25 and 28 to effect such a downward pull on the bolt 19 as to tightly clamp the lower end wall of the stub 11 between the head 20 and the wall 13 of the socket 9, thereby holding the seat 5 against accidental tilting from its adjusted position.

Instead of relying upon friction to hold the hand wheel 27 against accidental loosening movement, it is preferable to provide the collar 22 with a spring-pressed detent 35 cooperable with shallow sockets 36 in said hand wheel.

From the foregoing, it will be seen that novel and advantageous provision has been made for attaining the desired end, and while preferences have been disclosed, attention is again invited to the possibility of making variations.

I claim:

1. A seat mounting means comprising a socket member and supporting means therefor, said socket member having an upwardly open substantially hemi-spherical socket, a stub for attachment to a seat, said stub having a convex substantially hemi-spherical lower end received in said socket, said stub having a recess which is provided with a concave lower end concentric with said socket and said lower end of said stub, said socket member and stub having alined openings, a bolt extending through these openings and having a head in the aforesaid recess, said bolt being of considerably less diameter than the opening of said socket member, said head having a convex lower side resting on said concave lower end of said recess, a collar loosely surrounding said bolt under said socket member, means for holding said collar against rotation, a hand wheel rotatably mounted on said bolt under said collar, thrust means on said bolt holding said hand wheel against descent upon said bolt, and coacting means on said collar and hand wheel for downwardly pulling said bolt when said hand wheel is turned in one direction and for releasing the downward pull on said bolt when said hand wheel is turned in the other direction.

2. A structure as specified in claim 1; said coacting means on said collar and hand wheel including a pitched cam on at least one of these elements.

3. A structure as specified in claim 1; together with a spring-pressed detent and coacting sockets associated with these elements for holding the hand wheel against accidental rotation.

KENNETH F. HAIR.

REFERENCES CITED

The following references are of record in the file of this patent:

UNITED STATES PATENTS

| Number | Name | Date |
|---|---|---|
| 258,997 | Crandal | June 6, 1882 |
| 605,527 | Schwartz | June 14, 1898 |
| 1,535,894 | Biddle | Apr. 28, 1925 |
| 1,639,194 | Lasater | Aug. 16, 1927 |